(12) United States Patent
Gladwin et al.

(10) Patent No.: US 7,574,579 B2
(45) Date of Patent: Aug. 11, 2009

(54) METADATA MANAGEMENT SYSTEM FOR AN INFORMATION DISPERSED STORAGE SYSTEM

(75) Inventors: S. Christopher Gladwin, Chicago, IL (US); Matthew M. England, Chicago, IL (US); Dustin M. Hendrickson, Biggsville, IL (US); Zachary J. Mark, Chicago, IL (US); Vance T. Thornton, Chicago, IL (US); Jason K. Resch, Chicago, IL (US); Dhanvi Gopala Krishna Kapila Lakshmana Harsha, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 78 days.

(21) Appl. No.: 11/404,071

(22) Filed: Apr. 13, 2006

(65) Prior Publication Data
US 2007/0079083 A1   Apr. 5, 2007

Related U.S. Application Data

(63) Continuation-in-part of application No. 11/241,555, filed on Sep. 30, 2005.

(51) Int. Cl.
*G06F 12/00* (2006.01)
(52) U.S. Cl. .................. 711/171; 711/114
(58) Field of Classification Search .......... 711/111, 711/112, 114, 170, 171, 172, 113; 714/6; 705/40; 709/228, 216, 215
See application file for complete search history.

(56) References Cited

U.S. PATENT DOCUMENTS

| 4,092,732 | A | 5/1978 | Ouchi |
|---|---|---|---|
| 5,485,474 | A | 1/1996 | Rabin |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,356,949 | B1 * | 3/2002 | Katsandres et al. ......... 709/238 |

(Continued)

OTHER PUBLICATIONS

Chung, T. et al, "An Automatic Data Segmentation Method For 3D Measured Data Point", National Taiwan University, 1998, pp. 1-8.*

(Continued)

*Primary Examiner*—Pierre-Michel Bataille
(74) *Attorney, Agent, or Firm*—Eugene M. Cummings, P.C.

(57) ABSTRACT

Described is an information dispersal system in which original data to be stored is separated into a number of data "slices" in such a manner that the data in each subset is less usable or less recognizable or completely unusable or completely unrecognizable by itself except when combined with some or all of the other data subsets. These data subsets are stored on separate storage devices as a way of increasing privacy and security. A metadata management system stores and indexes user files across all of the storage nodes. The metadata management system stores metadata for dispersed data where: the dispersed data is in several pieces; and the metadata is in a separate dataspace from the dispersed data.

14 Claims, 12 Drawing Sheets

U.S. PATENT DOCUMENTS

| | | | |
|---|---|---|---|
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,609,223 | B1 | 8/2003 | Wolfgang |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,609 | B2 | 4/2006 | Wolfgang et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,240,236 | B2 | 7/2007 | Cutts et al. |
| 2002/0166079 | A1* | 11/2002 | Ulrich et al. .................. 714/6 |
| 2003/0065617 | A1* | 4/2003 | Watkins et al. ................ 705/40 |
| 2004/0024963 | A1* | 2/2004 | Talagala et al. ............. 711/114 |
| 2005/0114594 | A1* | 5/2005 | Corbett et al. .............. 711/114 |
| 2005/0125593 | A1 | 6/2005 | Karpoff et al. |
| 2005/0131993 | A1* | 6/2005 | Fatula, Jr. ................... 709/202 |
| 2005/0132070 | A1* | 6/2005 | Redlich et al. ............. 709/228 |
| 2005/0144382 | A1 | 6/2005 | Schmisseur |
| 2006/0047907 | A1 | 3/2006 | Shiga et al. |
| 2006/0156059 | A1 | 7/2006 | Kitamura |
| 2006/0224603 | A1* | 10/2006 | Correll, Jr. .................. 707/100 |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0174192 | A1 | 7/2007 | Gladwin et al. |

OTHER PUBLICATIONS

Shamir, "How to Share a Secret" Communications of the ACM, vol. 22, No. 11, Nov. 1979.

Rabin, "Efficient Dispersal of Information for Security, Load Balancing, and Fault Tolerance", Journal of the Association for Computing Machinery, vol. 36, No. 2, April pp. 335-348.

Chung, "An Automatic Data Segmentation Method for 3D Measured Data Points," National Taiwan University, 1998, pp. 1-8.

Shamir, "How to Share a Secret," Communications of the ACM, vol. 22, No. 11, Nov. 1979.

Rabin, "Efficient Dispersal of Information for Security, Load Balancing, and Fault Tolerance," Journal of the Association of Computing Machinery, vol. 36, No. 2, Apr. 1989.

Yong, Final Office Action in U.S. Appl. No. 11/241,555, filed Sep. 4, 2008, United States Patent & Trademark Office.

Tsui, Non-Final Office Action in U.S. Appl. No. 11/241,555, filed Aug. 7, 2007, United States Patent & Trademark Office.

Bataille, Advisory Action in U.S. Appl. No. 11/403,684, filed Sep. 4, 2008, United States Patent & Trademark Office.

Bataille, Final Office Action in U.S. Appl. No. 11/403,684, filed Jun. 26, 2008, United States Patent & Trademark Office.

Bataille, Non-Final Office Action in U.S. Appl. No. 11/403,684, filed Dec. 11, 2007, United States Patent & Trademark Office.

Bataille, Final Office Action in U.S. Appl. No. 11/404,071, filed Jun. 25, 2008, United States Patent & Trademark Office.

Dinh, Final Office Action in U.S. Appl. No. 11/403,391, filed Sep. 15, 2008, United States Patent & Trademark Office.

Dinh, Non-Final Office Action in U.S. Appl. No. 11/403,391, filed Apr. 17, 2008, United States Patent & Trademark Office.

Becamel, International Search Report for PCT Application PCT/US06/03894, Apr. 10, 2008, International Searching Authority.

Bragdon, International Search Report for PCT Application PCT/US07/07120, Jul. 2, 2008, International Searching Authority.

Selder, International Search Report for PCT Application PCT/US07/07285, Sep. 10, 2008, International Searching Authority.

Bataille, International Search Report for PCT Application PCT/US07/07119, Jul. 10, 2008, International Searching Authority.

* cited by examiner

| Node0 | Node1 | Node2 | Node3 | Node4 | Node5 | Type | Offset |
|---|---|---|---|---|---|---|---|
| X | | | | | | 1 | 0 |
| | X | | | | | 1 | 1 |
| X | X | | | | | 1 | 0 |
| | | X | | | | 1 | 2 |
| X | | X | | | | 2 | 0 |
| | X | X | | | | 1 | 1 |
| X | X | X | | | | 1 | 0 |
| | | | X | | | 1 | 3 |
| X | | | X | | | 3 | 0 |
| | X | | X | | | 2 | 1 |
| X | X | | X | | | 2 | 0 |
| | | X | X | | | 1 | 2 |
| X | | X | X | | | 3 | 2 |
| | X | X | X | | | 1 | 1 |
| | | | | X | | 1 | 4 |
| X | | | | X | | 2 | 4 |
| | X | | | X | | 3 | 1 |
| X | X | | | X | | 3 | 0 |
| | | X | | X | | 2 | 2 |
| X | | X | | X | | 4 | 0 |
| | X | X | | X | | 2 | 1 |
| | | | X | X | | 1 | 3 |
| X | | | X | X | | 2 | 3 |
| | X | | X | X | | 3 | 3 |
| | | X | X | X | | 1 | 2 |
| | | | | | X | 1 | 5 |
| X | | | | | X | 1 | 5 |
| | X | | | | X | 2 | 5 |
| X | X | | | | X | 1 | 5 |
| | | X | | | X | 3 | 2 |
| X | | X | | | X | 2 | 5 |
| | X | X | | | X | 3 | 1 |
| | | | X | | X | 2 | 3 |
| X | | | X | | X | 3 | 5 |
| | X | | X | | X | 4 | 1 |
| | | X | X | | X | 2 | 2 |
| | | | | X | X | 1 | 4 |
| X | | | | X | X | 1 | 4 |
| | X | | | X | X | 2 | 4 |
| | | | X | X | X | 1 | 3 |

FIG. 5

| Outage Type Num | Decode Operation | Decoded data |
|---|---|---|
| 1 | decode1 | d[0+offset]=c3d(2, 3, 4, offset) |
| 1 | decode2 | d[1+offset]=c3d(3, 4, 5, offset) |
| 2 | decode1 | d[0+offset]=c3d(5, 1, 3, offset) |
| 2 | decode2 | d[2+offset]=c3d(1, 3, 5, offset) |
| 3 | decode1 | d[0+offset]=c3d(4, 2, 5, offset) |
| 3 | decode2 | d[3+offset]=c3d(1, 2, 5, offset) |

FIG. 6

| Outage Type Num | Decode Operation | Decoded data |
|---|---|---|
| 1 | decode1 | d[1+offset]=c3d(3, 4, 5, offset) |
| 1 | decode2 | d[0+offset]=c3d(5, 1, 3, offset) |
| 1 | decode3 | d[2+offset]=c3d(4, 5, 0, offset) |
| 2 | decode1 | d[0+offset]=c3d(4, 5, 2, offset) |
| 2 | decode2 | d[3+offset]=c3d(2, 4, 0, offset) |
| 2 | decode3 | d[1+offset]=c3d(5, 0, 3, offset) |
| 3 | decode1 | d[1+offset]=(d(c[3+offset]-d[5+offset]+c[5+offset]-c[2+offset])/2 |
| 3 | decode2 | d[4+offset]=c3d(3, 5, 1, offset) |
| 3 | decode3 | d[0+offset]=c3d(5, 1, 3, offset) |
| 4 | decode1 | d[2+offset]=c3d(1, 3, 5, offset) |
| 4 | decode2 | d[0+offset]=c3d(5, 1, 3, offset) |
| 4 | decode3 | d[4+offset]=c3d(3, 5, 1, offset) |

FIG. 7

| Node0 | Node1 | Node2 | Node3 | Node4 | Node5 | Node6 | Node7 | Node8 | Type | Offset |
|---|---|---|---|---|---|---|---|---|---|---|
| x | x | | | | | | | | 1 | 0 |
| x | | x | | | | | | | 2 | 0 |
| x | | | x | | | | | | 3 | 0 |
| x | | | | x | | | | | 4 | 0 |
| x | | | | | x | | | | 4 | 5 |
| x | | | | | | x | | | 3 | 6 |
| x | | | | | | | x | | 2 | 7 |
| x | | | | | | | | x | 1 | 8 |
| | x | x | | | | | | | 1 | 1 |
| | x | | x | | | | | | 2 | 1 |
| | x | | | x | | | | | 3 | 1 |
| | x | | | | x | | | | 4 | 1 |
| | x | | | | | x | | | 4 | 6 |
| | x | | | | | | x | | 3 | 7 |
| | x | | | | | | | x | 2 | 8 |
| | | x | x | | | | | | 1 | 2 |
| | | x | | x | | | | | 2 | 2 |
| | | x | | | x | | | | 3 | 2 |
| | | x | | | | x | | | 4 | 2 |
| | | x | | | | | x | | 4 | 7 |
| | | x | | | | | | x | 3 | 8 |
| | | | x | x | | | | | 1 | 3 |
| | | | x | | x | | | | 2 | 3 |
| | | | x | | | x | | | 3 | 3 |
| | | | x | | | | x | | 4 | 3 |
| | | | x | | | | | x | 4 | 8 |
| | | | | x | x | | | | 1 | 4 |
| | | | | x | | x | | | 2 | 4 |
| | | | | x | | | x | | 3 | 4 |
| | | | | x | | | | x | 4 | 4 |
| | | | | | x | x | | | 1 | 5 |
| | | | | | x | | x | | 2 | 5 |
| | | | | | x | | | x | 3 | 5 |
| | | | | | | x | x | | 1 | 6 |
| | | | | | | x | | x | 2 | 6 |
| | | | | | | | x | x | 1 | 7 |

FIG. 8

DataspaceDirectorMap — 92

| iDataspaceID | INTEGER |
|---|---|
| iDirectorAppID | INTEGER |
| iRank | INTEGER |

DataspaceVolumeMap — 94

| iDataspaceID | INTEGER |
|---|---|
| iVolumeID | INTEGER |

TransactionContexts — 96

| iID | INTEGER |
|---|---|
| iDataspaceID | INTEGER |

AccountDataspaceMap — 93

| iAccountID | INTEGER |
|---|---|
| iDataspaceID | INTEGER |

Transaction Datasources — 98

| iTransactionID | INTEGER |
|---|---|
| iDataspaceID | INTEGER |
| iDatasourceID | INTEGER |
| iRevision | INTEGER |
| iParentID | INTEGER |
| sName | VARCHAR |
| iSize | INTEGER |
| iCreationTime | TIMESTAMP |
| tModificationTime | TIMESTAMP |

Datasources — 100

| iDatasourceID | INTEGER |
|---|---|
| iRevision | INTEGER |
| iTransactionContextID | INTEGER |
| iParentID | INTEGER |
| iSize | INTEGER |
| sName | VARCHAR |
| tCreationTime | TIMESTAMP |
| tModificationTime | TIMESTAMP |
| sSecurityContext | VARCHAR |

Applications — 102

| iID | INTEGER |
|---|---|
| iAppTypeID | INTEGER |
| iSiteID | INTEGER |

Dataspaces — 106

| iID | INTEGER |
|---|---|
| iStatus | INTEGER |
| sName | VARCHAR |

Transactions — 104

| iID | INTEGER |
|---|---|
| iTransactionContextID | INTEGER |

FIG. 11

METADATA MANAGEMENT SYSTEM FOR AN INFORMATION DISPERSED STORAGE SYSTEM

CROSS REFERENCE TO RELATED APPLICATIONS

This application is a continuation-in-part of commonly owned co-pending U.S. application Ser. No. 11/241,555, filed on Sep. 30, 2005.

BACKGROUND OF THE INVENTION

1. Field of the Invention

The present invention relates to a metadata management system and method for an information dispersal storage system which disperses information into a plurality of subsets or slices for storage in separate storage nodes coupled to a communication network and more particularly, to a metadata management system and method that can store and index metadata attributes of files, such as data source names, file size, last modification date and other data related information, of all file slices in all of the storage nodes coupled to the communication network in order to keep track of dispersed information and is also useful for dispersing data.

2. Description of the Prior Art

Various data storage systems are known for storing data. Normally such data storage systems store all of the data associated with a particular data set, for example, all the data of a particular user or all the data associated with a particular software application or all the data in a particular file, in a single dataspace (i.e single digital data storage device). Critical data is known to be initially stored on redundant digital data storage devices. Thus, if there is a failure of one digital data storage device, a complete copy of the data is available on the other digital data storage device. Examples of such systems with redundant digital data storage devices are disclosed in U.S. Pat. Nos. 5,890,156; 6,058,454; and 6,418,539, hereby incorporated by reference. Although such redundant digital data storage systems are relatively reliable, there are other problems with such systems. First, such systems essentially double or further increase the cost of digital data storage. Second, all of the data in such redundant digital data storage systems is in one place making the data vulnerable to unauthorized access.

In order to improve the security and thus the reliability of the data storage system, the data may be stored across more than one storage device, such as a hard drive, or removable media, such as a magnetic tape or a so called "memory stick," as set forth in U.S. Pat. No. 6,128,277, hereby incorporated by reference, as well as for reasons relating to performance improvements or capacity limitations. For example, recent data in a database might be stored on a hard drive while older data that is less often used might be stored on a magnetic tape. Another example is storing data from a single file that would be too large to fit on a single hard drive on two hard drives. In each of these cases, the data subset stored on each data storage device does not contain all of the original data, but does contain a generally continuous portion of the data that can be used to provide some usable information. For example, if the original data to be stored was the string of characters in the following sentence:

The quick brown fox jumped over the lazy dog.

and that data was stored on two different data storage devices, then either one or both of those devices would contain usable information. If for example, the first 20 characters of that 45 character string was stored on one data storage device and the remaining 25 characters were stored on a second data storage device, then the sentence be stored as follows:

The quick brown fox jumped (Stored on the first storage device)

over the lazy dog. (Stored on the second storage device)

In each case, the data stored on each device is not a complete copy of the original data, but each of the data subsets stored on each device provides some usable information.

Typically, the actual bit pattern of data storage on a device, such as a hard drive, is structured with additional values to represent file types, file systems and storage structures, such as hard drive sectors or memory segments. The techniques used to structure data in particular file types using particular file systems and particular storage structures are well known and allow individuals familiar with these techniques to identify the source data from the bit pattern on a physical media.

In order to make sure that stored data is only available to authorized users, data is often stored in an encrypted form using one of several known encryption techniques, such as DES, AES or several others. These encryption techniques store data in some coded form that requires a mathematical key that is ideally known only to authorized users or authorized processes. Although these encryption techniques are difficult to "break", instances of encryption techniques being broken are known, making the data on such data storage systems vulnerable to unauthorized access.

In addition to securing data using encryption, several methods for improving the security of data storage using information dispersal algorithms have been developed, for example as disclosed in U.S. Pat. No. 6,826,711 and US Patent Application Publication No. US 2005/0144382, hereby incorporated by reference. Such information dispersal algorithms are used to "slice" the original data into multiple data subsets and distribute these subsets to different storage nodes (i.e different digital data storage devices). Individually, each data subset or slice does not contain enough information to recreate the original data; however, when threshold number of subsets (i.e. less than the original number of subsets) are available, all the original data can be exactly created.

The use of such information dispersal algorithms in data storage systems is also described in various trade publications. For example, "How to Share a Secret", by A. Shamir, *Communications of the ACM*, Vol. 22, No. 11, November 1979, describes a scheme for sharing a secret, such as a cryptographic key, based on polynomial interpolation. Another trade publication, "Efficient Dispersal of Information for Security, Load Balancing, and Fault Tolerance", by M. Rabin, *Journal of the Association for Computing Machinery*, Vol. 36, No. 2, April 1989, pgs. 335-348, also describes a method for information dispersal using an information dispersal algorithm. Unfortunately, these methods and other known information dispersal methods are computationally intensive and are thus not applicable for general storage of large amounts of data using the kinds of computers in broad use by businesses, consumers and other organizations today. Thus there is a need for a data storage system that is able to reliably and securely protect data that does not require the use of computation intensive algorithms.

SUMMARY OF THE INVENTION

Briefly, the present invention relates to an information dispersal sytem in which original data to be stored is separated into a number of subsets or data "slices" in such a manner that the data in each subset is less usable or less recognizable or completely unusable or completely unrecognizable by itself except when combined with some or all of the other data slices. These data slices are stored on separate storage devices (i.e., separate dataspaces) as a way of increasing privacy and security. In accordance with an important aspect of the invention, a metadata management system stores and indexes user files across all of the storage nodes. The metadata management system includes a number of applications that run on the servers supporting these storage nodes and are responsible for controlling the metadata. Metadata is the information about the data, the data slices or data subsets and the way in which these data subsets are dispersed among different storage nodes running over the network. More particularly, metadata includes data source names, their size, last modification date, authentication information etc. This information is required to keep track of dispersed data subsets among all the nodes in the system. Every time new data subsets are stored and old ones are removed from the storage nodes, the metadata is updated. In accordance with an important aspect of the invention, the metadata management system stores metadata for dispersed data where:

The dispersed data is in several pieces.

The metadata is in a separate dataspace from the dispersed data.

Accordingly, the metadata management system is able to manage the metadata in a manner that is computationally efficient relative to known systems in order to enable broad use of the invention using the types of computers generally used by businesses, consumers and other organizations currently.

DESCRIPTION OF THE DRAWING

These and other advantages of the present invention will be readily understood with reference to the following drawing and attached specification wherein:

FIG. 5 is an exemplary table in accordance with the present invention that can be used to recreate data which has been stored on the exemplary six digital data storage devices.

FIG. 6 is an exemplary table that lists the decode equations for an exemplary six node data storage system for a condition of two node outages FIG. 7 is similar to FIG. 6 but for a condition with three node outages FIG. 8 is a table that lists all possible storage node outage states for an exemplary data storage system with nine storage nodes for a condition with two node outages.

FIG. 11 shows the essential metadata components that are used during user transactions and during user file set lookup.

DETAILED DESCRIPTION

Figure 1:
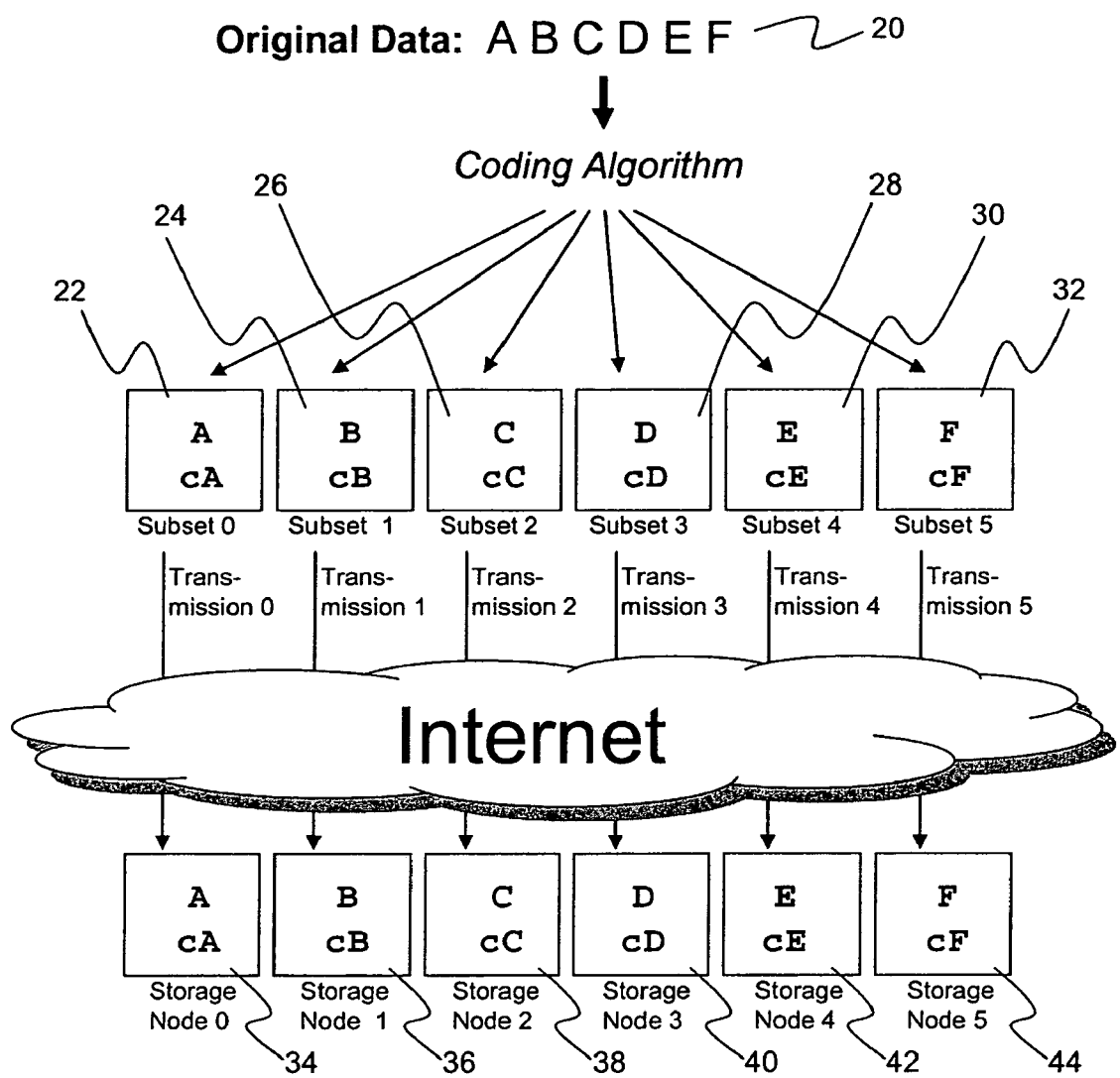
FIG. 1 is a block diagram of an exemplary data storage system in accordance with the present invention which illustrates how the original data is sliced into data subsets, coded and transmitted to a separate digital data storage device or node.

The present invention relates to a billing system for an information dispersal storage system or data storage system. The information dispersal storage system is illustrated and described in connection with FIGS. 1-8. A metadata management system for managing information dispersal on a grid which includes a plurality of storage nodes is illustrated in FIGS. 9-12.

Information Dispersal Storage System

In order to protect the security of the original data, the original data is separated into a number of data "slices" or subsets. The amount of data in each slice is less usable or less recognizable or completely unusable or completely unrecognizable by itself except when combined with some or all of the other data subsets. In particular, the system in accordance with the present invention "slices" the original data into data subsets and uses a coding algorithm on the data subsets to create coded data subsets. Each data subset and its corresponding coded subset may be transmitted separately across a communications network and stored in a separate storage node in an array of storage nodes. In order to recreate the original data, data subsets and coded subsets are retrieved from some or all of the storage nodes or communication channels, depending on the availability and performance of each storage node and each communication channel. The original data is recreated by applying a series of decoding algorithms to the retrieved data and coded data.

As with other known data storage systems based upon information dispersal methods, unauthorized access to one or more data subsets only provides reduced or unusable information about the source data. In accordance with an important aspect of the invention, the system codes and decodes data subsets in a manner that is computationally efficient relative to known systems in order to enable broad use of this method using the types of computers generally used by businesses, consumers and other organizations currently.

In order to understand the invention, consider a string of N characters $d_0, d_1, \ldots, d_N$ which could comprise a file or a system of files. A typical computer file system may contain gigabytes of data which would mean N would contain trillions of characters. The following example considers a much smaller string where the data string length, N, equals the number of storage nodes, n. To store larger data strings, these methods can be applied repeatedly. These methods can also be applied repeatedly to store computer files or entire file systems.

For this example, assume that the string contains the characters, O L I V E R where the string contains ASCII character codes as follows:

$d_0 = O = 79$ $d_1 = L = 76$ $d_2 = I = 73$ $d_3 = V = 86$ $d_4 = E = 69$ $d_5 = R = 82$

The string is broken into segments that are n characters each, where n is chosen to provide the desired reliability and security characteristics while maintaining the desired level of computational efficiency—typically n would be selected to be below 100. In one embodiment, n may be chosen to be greater than four (4) so that each subset of the data contains less than, for example, ¼ of the original data, thus decreasing the recognizablity of each data subset.

In an alternate embodiment, n is selected to be six (6), so that the first original data set is separated into six (6) different data subsets as follows:

$A=d_0, B=d_1, C=d_2, D=d_3, E=d_4, F=d_5$

For example, where the original data is the starting string of ASCII values for the characters of the text O L I V E R, the values in the data subsets would be those listed below:

A=79

B=76

C=73

D=86

E=69

F=82

In this embodiment, the coded data values are created by adding data values from a subset of the other data values in the original data set. For example, the coded values can be created by adding the following data values:

$c[x]=d[n\_mod(x+1)]+d[n\_mod(x+2)]+d[n\_mod(x+4)]$ where:

c[x] is the xth coded data value in the segment array of coded data values d[x+1] is the value in the position 1 greater than x in a array of data values d[x+2] is the value in the position 2 greater than x in a array of data values d[x+4] is the value in the position 4 greater than x in a array of data values n_mod( ) is function that performs a modulo operation over the number space 0 to n−1

Using this equation, the following coded values are created:

cA, cB, cC, cD, cE, cF where cA, for example, is equal to B+C+E and represents the coded value that will be communicated and/or stored along with the data value, A.

For example, where the original data is the starting string of ASCII values for the characters of the text O L I V E R, the values in the coded data subsets would be those listed below:

cA=218 cB=241 cC=234 cD=227 cE=234 cF=241

The original data set 20, consisting of the exemplary data ABCDEF is sliced into, for example, six (6) data subsets A, B, C, D, E and F. The data subsets A, B, C, D, E and F are also coded as discussed below forming coded data subsets cA, cB, cC, cD, cE and cF. The data subsets A, B, C, D, E and F and the coded data subsets cA, cB, cC, cD, cE and cF are formed into a plurality of slices 22, 24, 26, 28, 30 and 32 as shown, for example, in FIG. 1. Each slice 22, 24, 26, 28, 30 and 32, contains a different data value A, B, C, D, E and F and a different coded subset cA, cB, cC, cD, cE and cF. The slices 22, 24, 26, 28, 30 and 32 may be transmitted across a communications network, such as the Internet, in a series of data transmissions and each stored in a different digital data storage device or storage node 34, 36, 38, 40, 42 and 44.

Figure 2:
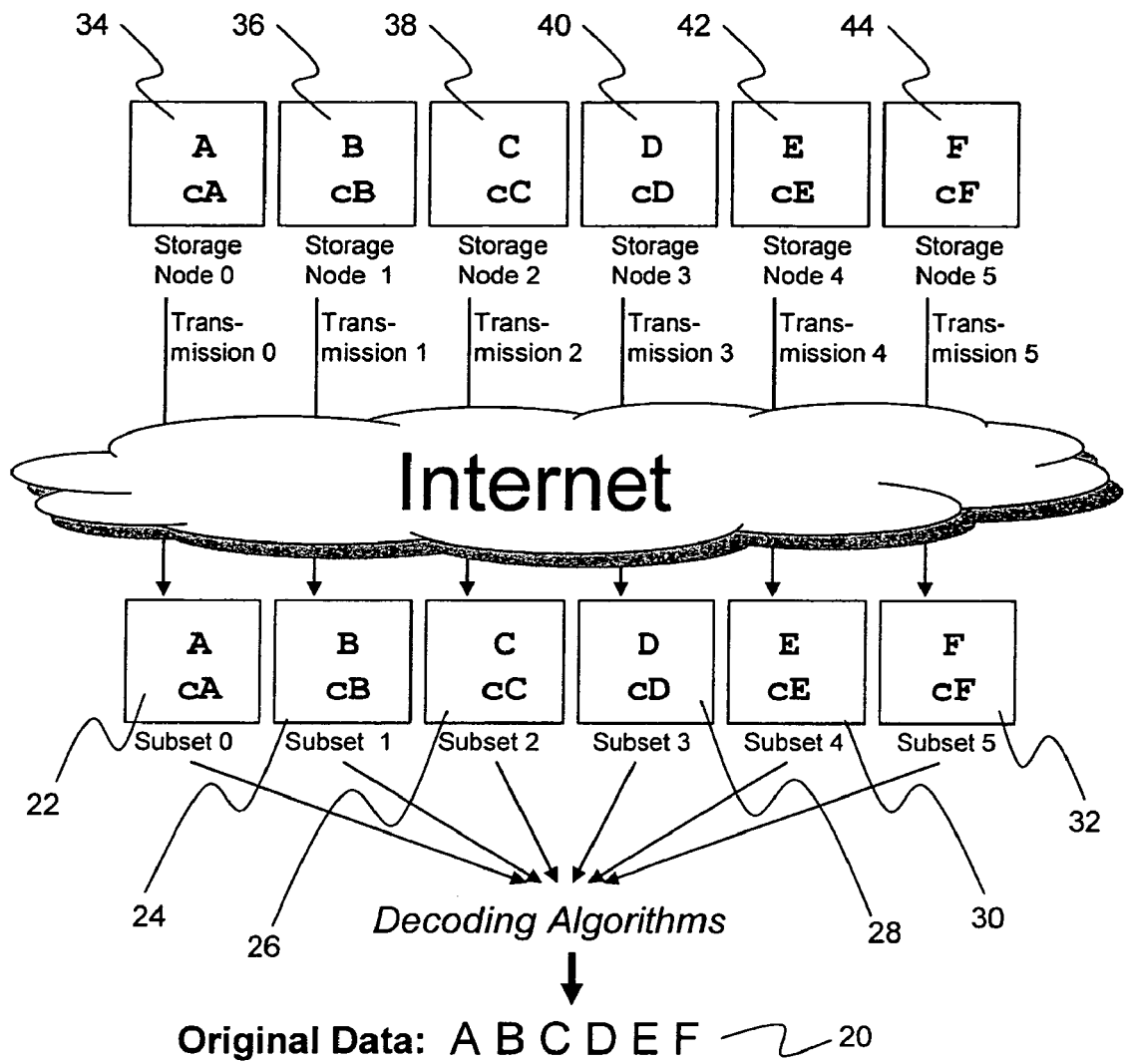
FIG. 2 is similar to FIG. 1 but illustrates how the data subsets from all of the exemplary six nodes are retrieved and decoded to recreate the original data set.

In order to retrieve the original data (or receive it in the case where the data is just transmitted, not stored), the data can reconstructed as shown in FIG. 2. Data values from each storage node 34, 36, 38, 40, 42 and 44 are transmitted across a communications network, such as the Internet, to a receiving computer (not shown). As shown in FIG. 2, the receiving computer receives the slices 22, 24, 26, 28, 30 and 32, each of which contains a different data value A, B, C, D, E and F and a different coded value cA, cB, cC, cD, cE and cF.

Figure 3:
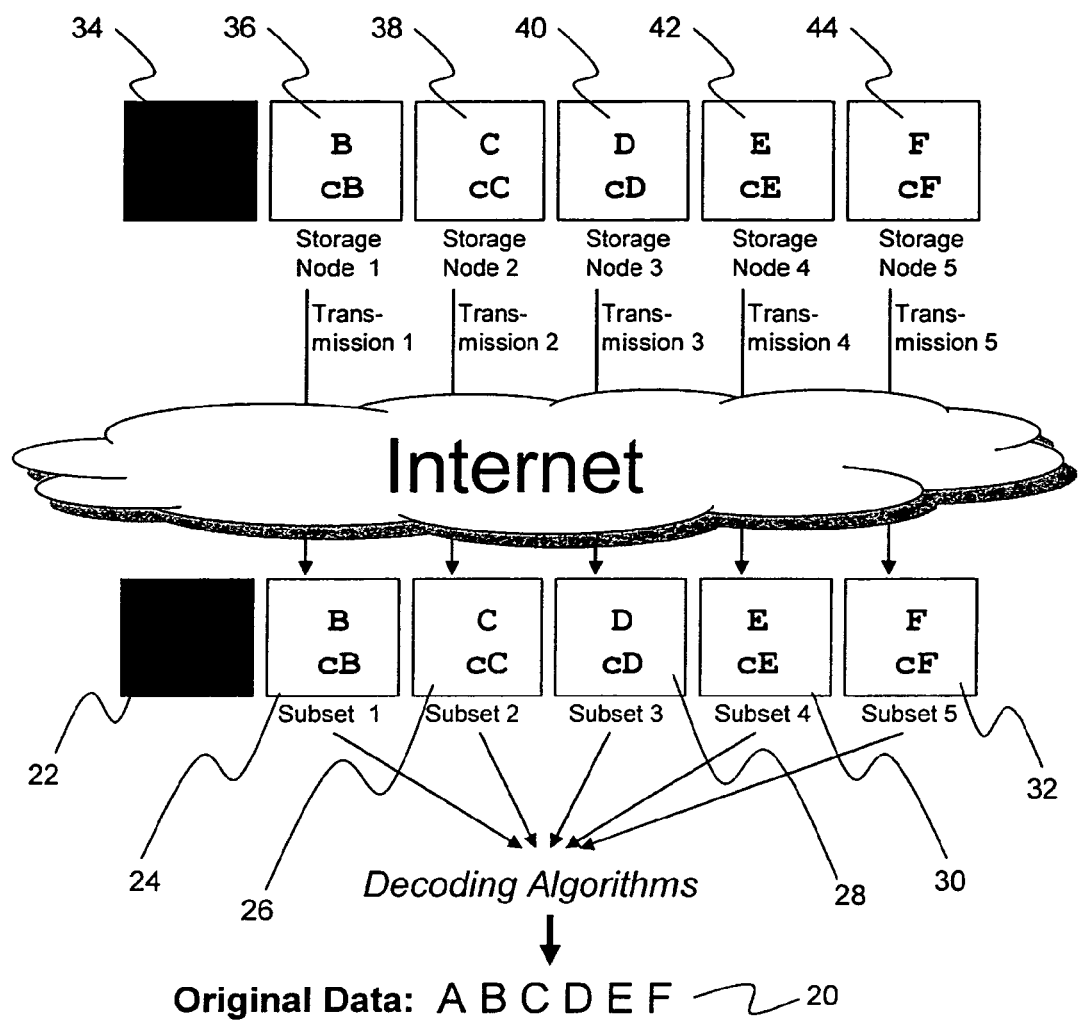
FIG. 3 is similar to FIG. 2 but illustrates a condition of a failure of one of the six digital data storage devices.

For a variety of reasons, such as the outage or slow performance of a storage node 34, 36, 38, 40, 42 and 44 or a communications connection, not all data slices 22, 24, 26, 28, 30 and 32 will always be available each time data is recreated. FIG. 3 illustrates a condition in which the present invention recreates the original data set when one data slice 22, 24, 26, 28, 30 and 32, for example, the data slice 22, containing the data value A and the coded value cA, is not available. In this case, the original data value A can be obtained as follows:

$A=cC-D-E$ where cC is a coded value and D and E are original data values, available from the slices 26, 28 and 30, which are assumed to be available from the nodes 38, 40 and 42, respectively. In this case the missing data value can be determined by reversing the coding equation that summed a portion of the data values to create a coded value by subtracting the known data values from a known coded value.

For example, where the original data is the starting string of ASCII values for the characters of the text O L I V E R, the data value of the A could be determined as follows:

$A=234-86-69$

Therefore A=79 which is the ASCII value for the character, O.

Figure 4:
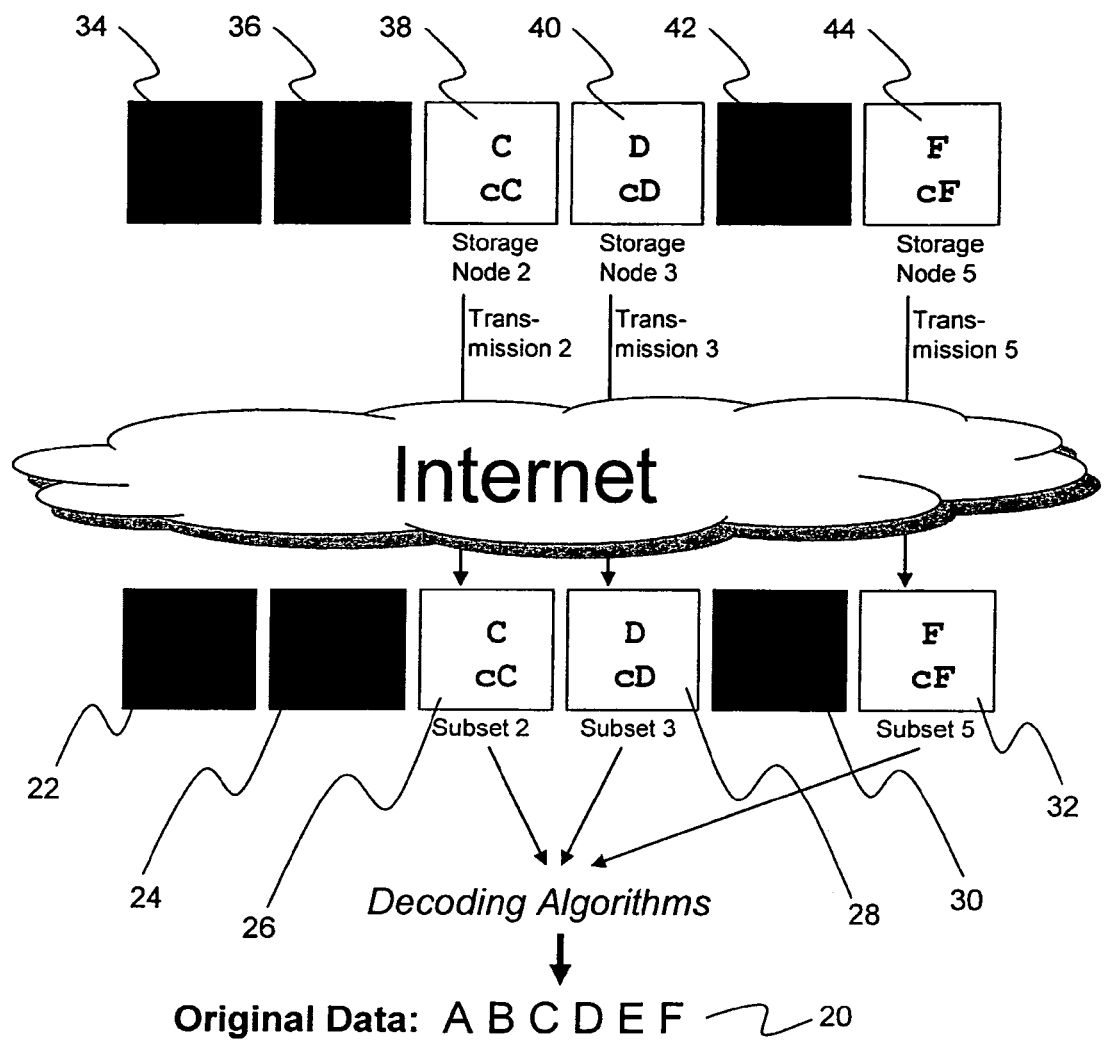
FIG. 4 is similar FIG. 3 but for the condition of a failure of three of the six digital data storage devices.

In other cases, determining the original data values requires a more detailed decoding equation. For example, FIG. 4 illustrates a condition in which three (3) of the six (6) nodes 34, 36 and 42 which contain the original data values A, B and E and their corresponding coded values cA, cB and cE are not available. These missing data values A, B and E and corresponding in FIG. 4 can be restored by using the following sequence of equations:

$B=(cD-F+cF-cC)/2$     1.

$E=cD-F-B$     2.

$A=cF-B-D$     3.

These equations are performed in the order listed in order for the data values required for each equation to be available when the specific equation is performed.

For example, where the original data is the starting string of ASCII values for the characters of the text O L I V E R, the data values of the B, E and A could be determined as follows:

$$B=(227-82+241-234)/2 \quad 1.$$

B=76

$$E=227-82-76 \quad 2.$$

E=69

$$A=241-76-86 \quad 3.$$

A=79

In order to generalize the method for the recreation of all original data ABCDEF when n=6 and up to three slices 22, 24, 26, 28 30 and 32 are not available at the time of the recreation, FIG. 5 contains a table that can be used to determine how to recreate the missing data. This table lists the 40 different outage scenarios where 1, 2, or 3 out of six storage nodes are not available or performing slow enough as to be considered not available. In the table in FIG. 5, an 'X' in a row designates that data and coded values from that node are not available. The 'Type' column designates the number of nodes not available. An 'Offset' value for each outage scenario is also indicated. The offset is the difference between the spatial position of a particular outage scenario and the first outage scenario of that Type.

The data values can be represented by the array d[x], where x is the node number where that data value is stored. The coded values can be represented by the array c[x].

In order to reconstruct missing data in an outage scenario where one node is not available in a storage array where n=6, the follow equation can be used:

$$d[0+\text{offset}]=c3d(2, 3, 4, \text{offset})$$

where c3d( ) is a function in pseudo computer software code as follows:

```
c3d(coded_data_pos, known_data_a_pos, known_data_b_pos, offset)
{
    unknown_data=
        c[n_mod(coded_data_pos+offset)]-
        d[n_mod(known_data_a_pos+offset)]-
        d[n_mod(known_data_b_pos+offset)];
    return unknown_data
}
``` where n_mod( ) is the function defined previously.

In order to reconstruct missing data in an outage scenario where two nodes are not available in a storage array where n=6, the equations in the table in FIG. 6 can be used. In FIG. 6, the 'Outage Type Num' refers to the corresponding outage 'Type' from FIG. 5. The 'Decode Operation' in FIG. 6 refers to the order in which the decode operations are performed. The 'Decoded Data' column in FIG. 6 provides the specific decode operations which produces each missing data value.

In order to reconstruct missing data in an outage scenario where three nodes are not available in a storage array where n=6, the equations in the table in FIG. 7 can be used. Note that in FIG. 7, the structure of the decode equation for the first decode for outage type=3 is a different structure than the other decode equations where n=6.

The example equations listed above are typical of the type of coding and decoding equations that create efficient computing processes using this method, but they only represent one of many examples of how this method can be used to create efficient information distribution systems. In the example above of distributing original data on a storage array of 6 nodes where at least 3 are required to recreate all the data, the computational overhead of creating the coded data is only two addition operations and three modulo operations per byte. When data is decoded, no additional operations are required if all storage nodes and communications channels are available. If one or two of the storage nodes or communications channels are not available when n=6, then only two addition/subtraction operations are required to decode each missing data value. If three storage nodes or communications channels are missing when n=6, then just three addition/subtraction operations are required for each missing byte in 11 of 12 instances—in that twelfth instance, only 4 computational operations are required (3 addition/subtractions and one division by an integer). This method is more computationally efficient that known methods, such as those described by Rabin and Shamir.

This method of selecting a computationally efficient method for secure, distributed data storage by creating coded values to store at storage nodes that also store data subsets can be used to create data storage arrays generally for configurations where n=4 or greater. In each case decoding equations such as those detailed above can be used to recreate missing data in a computationally efficient manner.

Coding and decoding algorithms for varying grid sizes which tolerate varying numbers of storage node outages without original data loss can also be created using these methods. For example, to create a 9 node grid that can tolerate the loss of 2 nodes, a candidate coding algorithm is selected that uses a mathematical function that incorporates at least two other nodes, such as:

$$c[x]=d[n\_\text{mod}(x+1)]+d[n\_\text{mod}(x+2)]$$

where:
n=9, the number of storage nodes in the grid
c[x] is the xth coded data value in the segment array of coded data values
d[x+1] is the value in the position 1 greater than x in a array of data values
d[x+2] is the value in the position 2 greater than x in a array of data values
n_mod( ) is function that performs a mod over the number space 0 to n−1

In this example embodiment, n=9, the first data segment is separated into different data subsets as follows:

$$A=d_0, B=d_1, C=d_2, D=d_3, E=d_4, F=d_5, G=d_6, H=d_7, I=d_8$$

Using this candidate coding algorithm equation above, the following coded values are created:

cA, cB, cC, cD, cE, cF, cG, cH, cI

The candidate coding algorithm is then tested against all possible grid outage states of up to the desired number of storage node outages that can be tolerated with complete data restoration of all original data. FIG. 8 lists all possible storage grid cases for a 9 storage node grid with 2 storage node outages. Although there are 36 outage cases on a 9 node storage grid with 2 storage node outages, these can be grouped into 4 Types as shown in FIG. 8. Each of these 4 Types represent a particular spatial arrangement of the 2 outages, such as the 2 storage node outages being spatially next to each other in the grid (Type 1) or the 2 storage node outages being separated by one operating storage node (Type 2). The offset listed in FIG. 8 shows the spatial relationship of each outage case within the same Type as they relate to the first outage case of that Type listed in that table. For example, the first instance of a Type 1 outage in FIG. 8 is the outage case where Node0 and Node1 are out. This first instance of a Type 1 outage is then assigned the Offset value of 0. The second instance of a Type 1 outage in FIG. 8 is the outage case where Node1 and Node2 are out. Therefore, this second instance of a Type 1 outage is assigned the Offset value of 1 since the two storage nodes outages occur at storage nodes that are 1 greater than the location of the storage node outages in the first case of Type 1 in FIG. 8.

The validity of the candidate coding algorithm can be tested by determining if there is a decoding equation or set of decoding equations that can be used to recreate all the original data in each outage Type and thus each outage case. For example, in the first outage case in FIG. 8, Node0 and Node1 are out. This means that the data values A and B are not directly available on the storage grid. However, A can be recreated from cH as follows:

$$cH=I+A$$

$$A=cH-I$$

The missing data value B can then be created from cI as follows:

$$cI=A+B$$

$$B=cI-A$$

This type of validity testing can then be used to test if all original data can be obtained in all other instances where 2 storage nodes on a 9 node storage grid are not operating. Next, all instances where 1 storage node is not operating on a 9 node storage grid are tested to verify whether that candidate coding algorithm is valid. If the validity testing shows that all original data can be obtained in every instance of 2 storage nodes not operating on a 9 node storage grid and every instance of 1 storage node not operating on a 9 node storage grid, then that coding algorithm would be valid to store data on a 9 node storage grid and then to retrieve all original data from that grid if up to 2 storage nodes were not operating.

These types of coding and decoding algorithms can be used by those practiced in the art of software development to create storage grids with varying numbers of storage nodes with varying numbers of storage node outages that can be tolerated by the storage grid while perfectly restoring all original data.

Metadata Management System for Information Dispersal Storage System

In accordance with an important aspect of the invention, a metadata management system is used to manage dispersal and storage of information that is dispersed and stored in several storage nodes coupled to a common communication network forming a grid, for example, as discussed above in connection with FIGS. 1-8. In order to enhance the reliability of the information dispersal system, metadata attributes of the transactions on the grid are stored in separate dataspace from the dispersed data.

As discussed above, the information dispersal system "slices" the original data into data subsets and uses a coding algorithm on the data subsets to create coded data subsets. In order to recreate the original data, data subsets and coded subsets are retrieved from some or all of the storage nodes or communication channels, depending on the availability and performance of each storage node and each communication channel. As with other known data storage systems based upon information dispersal methods, unauthorized access to one or more data subsets only provides reduced or unusable information about the source data. For example as illustrated in FIG. 1, each slice 22, 24, 26, 28, 30 and 32, contains a different data value A, B, C, D, E and F and a different "coded subset" (Coded subsets are generated by algorithms and are stored with the data slices to allow for restoration when restoration is done using part of the original subsets) cA, cB, cC, cD, cE and cF. The slices 22, 24, 26, 28, 30 and 32 may be transmitted across a communications network, such as the Internet, in a series of data transmissions and each stored in a different digital data storage device or storage node 34, 36, 38, 40, 42 and 44 (i.e., dataspace). Each data slice and its corresponding coded subset may be transmitted separately across a communications network and stored in a separate storage node in an array of storage nodes.

A "file stripe" is the set of data and/or coded subsets corresponding to a particular file. Each file stripe may be stored on a different set of data storage devices or storage nodes 57 within the overall grid as available storage resources or storage nodes may change over time as different files are stored on the grid.

A "dataspace" is a portion of a storage grid 49 that contains the data of a specific client 64. A grid client may also utilize more than one dataspace. The dataspaces table 106 in FIG. 11 shows all dataspaces associated with a particular client. Typically, particular grid clients are not able to view the dataspaces of other grid clients in order to provide data security and privacy.

Figure 9:
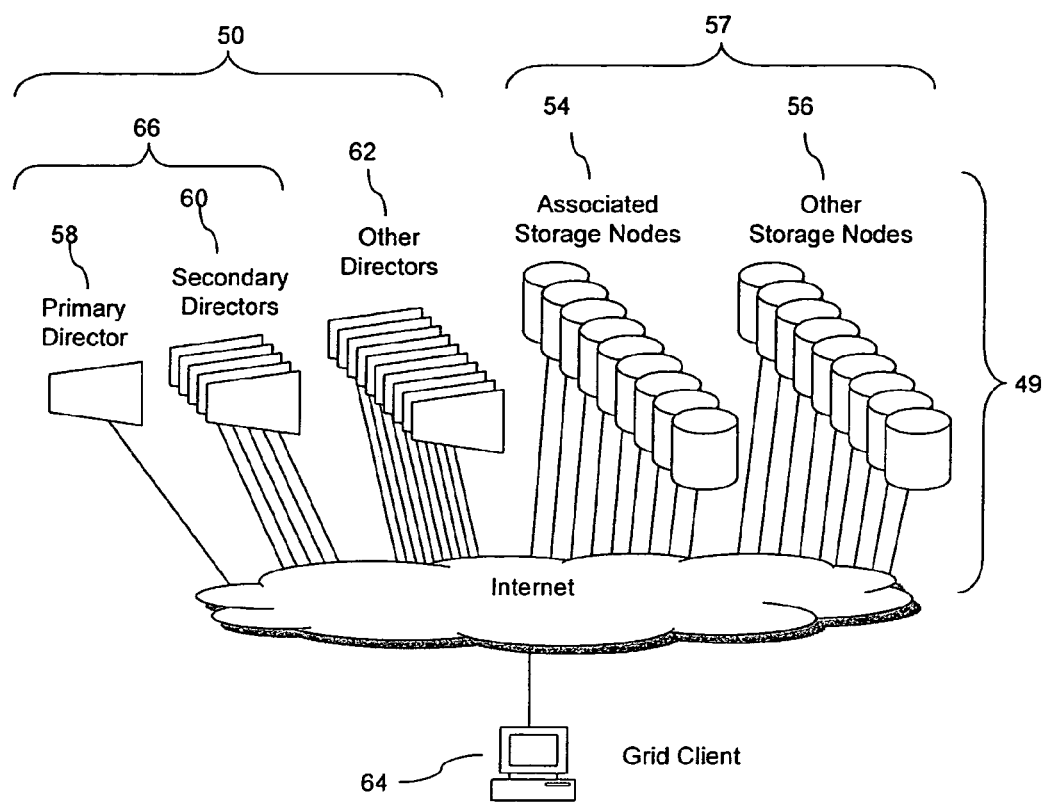
FIG. 9 is an exemplary diagram in accordance with the present invention which illustrates the various functional elements of a metadata management system for use with an information dispersal storage system in accordance with the present invention.

FIG. 9 shows the different components of a storage grid, generally identified with the reference numeral 49. The grid 49 includes storage nodes 54 associated with a specific grid client 64 as well as other storage nodes 56 associated with other grid clients (collectively or individually "the storage nodes 57"), connected to a communication network, such as the Internet. The grid 49 also includes applications for managing client backups and restorations in terms of dataspaces and their associated collections.

In general, a "director" is an application running on the grid 49. The director serves various purposes, such as:
1. Providing a centralized-but-duplicatable point of User-Client login. The Director is the only grid application that stores User-login information.
2. Autonomously providing a per-User list of stored files. All User-Client's can acquire the entire list of files stored on the Grid for each user by talking to one and only one director. This file-list metadata is duplicated across one Primary Directory to several Backup Directors.
3. Tracking which Sites contain User Slices.
4. Managing Authentication Certificates for other Node personalities.

The applications on the grid form a metadata management system and include a primary director 58, secondary directors 60 and other directors 62. Each dataspace is always associated at any given time with one and only one primary director 58. Every time a grid client 64 attempts any dataspace operation (save/retrieve), the grid client 64 must reconcile the operation with the primary director 58 associated with that dataspace. Among other things, the primary director 58 manages exclusive locks for each dataspace. Every primary director 58 has at least one or more secondary directors 60. In order to enhance reliability of the system, any dataspace metadata updates (especially lock updates) are synchronously copied by the dataspace's primary director 58 and to all of its secondary or backup directors 60 before returning acknowledgement status back to the requesting grid client 64. In addition, for additional reliability, all other directors 62 on the Grid may also asynchronously receive a copy of the metadata update. In such a configuration, all dataspace metadata is effectively copied across the entire grid 49.

As used herein, a primary director 58 and its associated secondary directors 60 are also referred to as associated directors 60. The secondary directors 60 ensure that any acknowledged metadata management updates are not lost in the event that a primary director 58 fails in the midst of a grid client 64 dataspace update operation. There exists a trade-off between the number of secondary directors 60 and the metadata access performance of the grid 49. In general, the greater the number of secondary directors 60, the higher the reliability of metadata updates, but the slower the metadata update response time.

The associated directors 66 and other directors 62 do not track which slices are stored on each storage node 57, but rather keep track of the associated storage nodes 57 associated with each grid client 64. Once the specific nodes are known for each client, it is necessary to contact the various storage nodes 57 in order to determine the slices associated with each grid client 64.

While the primary director 58 controls the majority of grid metadata; the storage nodes 57 serve the following responsibilities:

1. Store the user's slices. The storage nodes 57 store the user slices in a file-system that mirrors the user's file-system structure on the Client machine(s).
2. Store a list of per-user files on the storage node 57 in a database. The storage node 57 associates minimal metadata attributes, such as Slice hash signatures (e.g., MD5s) with each slice "row" in the database.

The Grid identifies each storage node 57 with a unique storage volume serial number (volumeID) and as such can identify the storage volume even when it is spread across multiple servers. In order to recreate the original data, data subsets and coded subsets are retrieved from some or all of the storage nodes 57 or communication channels, depending on the availability and performance of each storage node 57 and each communication channel. Each primary director 58 keeps a list of all storage nodes 57 on the grid 49 and therefore all the nodes available at each site.

Following is the list of key metadata attributes used during backup/restore processes:

application returns to the grid client 64 in step 72, a DataspaceDirectorMap 92 (FIG. 11). The director application includes an AccountDataspaceMap 93; a look up table which looks up the grid client's AccountID in order to determine the DataspaceID. The DataspaceID is then used to determine the grid client's primary director (i.e. DirectorAppID) from the DataspaceDirectorMap 92.

Once the grid client 64 knows its primary director 58, the grid client 64 can request a Dataspace VolumeMap 94 (FIG. 11) and use the DataspaceID to determine the storage nodes associated with that grid client 64 (i.e. VolumeID). The primary director 58 sets up a TransactionContextID for the grid client 64 in a Transactions table 102 (FIG.11). The TransactionContextID is unique for each transaction (i.e for each running instance or session of the grid client 64). In particular, the Dataspace ID from the DataspaceDirectorMap 92 is used to create a unique transaction ID in a TransactionContexts table 96. The transaction ID is stored in a Transaction table 102 along with the TransactionContextID in order to keep track of all transactions by all of the grid clients for each session of a grid client with the grid 49.

The "TransactionContextId" metadata attribute is a different attribute than TransactionID in that a client can be involved with more than one active transactions (not committed) but at all times only one "Transaction context Id" is associated with one running instance of the client. These metadata attributes allow management of concurrent transactions by different grid clients.

As mentioned above, the primary director 58 maintains a list of the storage nodes 57 associated with each grid client 64. This list is maintained as a TransactionContexts table 96 which maintains the identities of the storade nodes (i.e. DataspaceID) and the identity of the grid client 64 (i.e. ID). The primary director 58 contains the "Application" metadata ( i.e. Applications table 104) used by the grid client 64 to communicate with the primary director 58. The Applications table 64 is used to record the type of transaction (App-

| Attribute | Description |
| --- | --- |
| iAccountID | Unique ID number for each account, unique for each user. |
| iDataspaceID | Unique ID for each user on all the volumes, it is used to keep track of the user data on each volume |
| iDirectorAppID | Grid wide unique ID which identifies a running instance of the director. |
| iRank | Used to insure that primary director always has accurate metadata. |
| iVolumeID | Unique for identifying each volume on the Grid, director uses this to generate a volume map for a new user (first time) and track volume map for existing users. |
| iTransactionContextID | Identifies a running instance of a client. |
| iApplicationID | Grid wide unique ID which identifies running instance of an application. |
| iDatasourceID | All the contents stored on the grid is in the form of data source, each unique file on the disk is associated with this unique ID. |
| iRevision | Keeps track of the different revisions for a data source. |
| iSize | Metadata to track the size of the data source |
| sName | Metadata to track the name of the data source |
| iCreationTime | Metadata to track the creation time of the data source |
| iModificationTime | Metadata to track the last modification time of the data source, |

Figure 10:
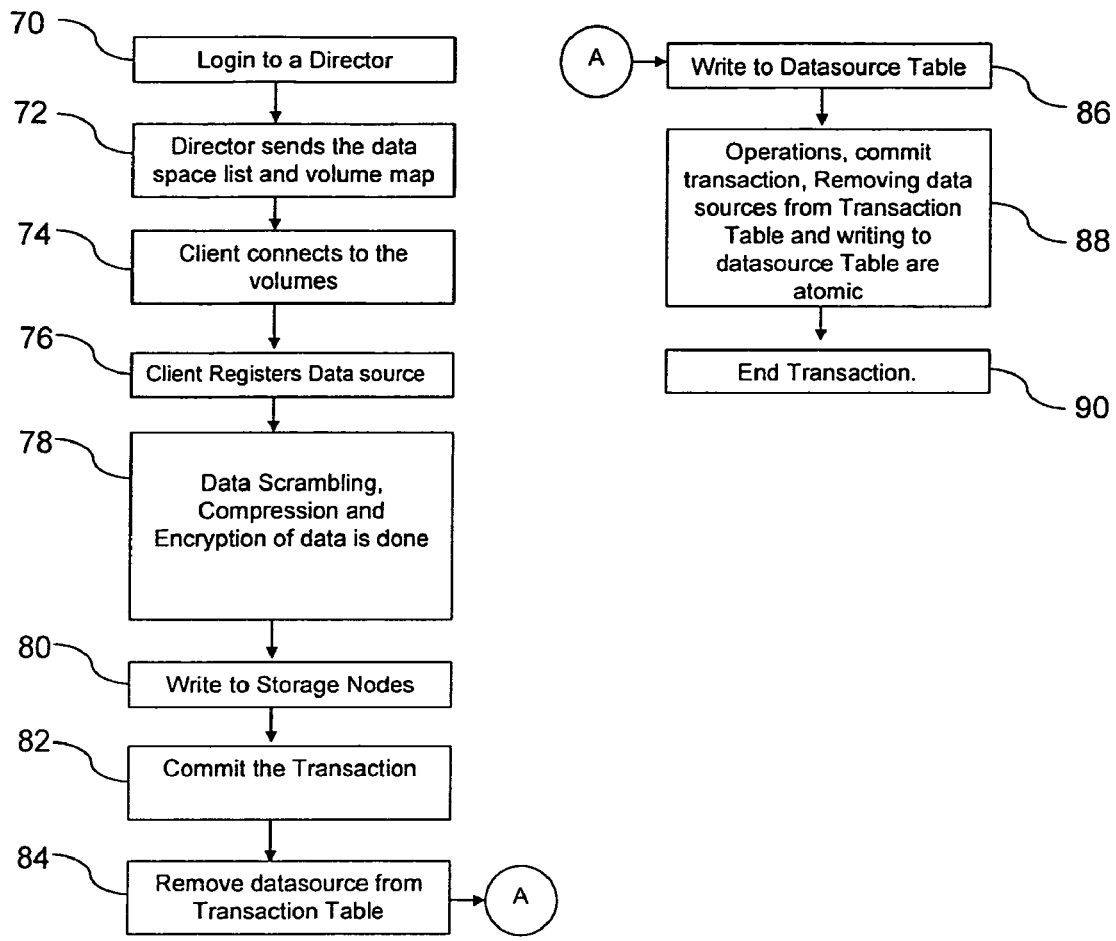
FIG. 10 is an exemplary flow chart that shows the process for maintaining metadata for data stored on the dispersed data storage grid.

FIG. 10 describes a flow of data and a top level view of what happens when a client interacts with the storage system. FIG. 11 illustrates the key metadata tables that are used to keep track of user info in the process.

Referring to FIG. 10, initially in step 70, a grid client 64 starts with logging in to a a director application running on a server on the grid. After a successful log in, the director TypeID), for example add or remove data slices and the storage nodes 57 associated with the transaction (i.e. SiteID).

Before any data transfers begins, the grid client 64 files metadata with the primary director 58 regarding the intended transaction, such as the name and size of the file as well as its creation date and modification date, for example. The metadata may also include other metadata attributes, such as the various fields illustrated in the TransactionsDatasources table 98. (FIG. 11) The Transaction Datasources metadata table 98 is used to keep control over the transactions until the transactions are completed.

After the above information is exchanged between the grid client 64 and the primary director 58, the grid client 64 connects to the storage nodes in step 74 in preparation for transfer of the file slices. Before any information is exchanged, the grid client 64 registers the metadata in its Datasources table 100 in step 76 in order to fill in the data fields in the Transaction Datasources table 98.

Next in step 78, the data slices and coded subsets are created in the manner discussed above by an application running on the grid client 64. Any data scrambling, compression and/or encryption of the data may be done before or after the data has been dispersed into slices. The data slices are then uploaded to the storage nodes 57 in step 80.

Once the upload starts, the grid client 64 uses the transaction metadata (i.e. data from Transaction Datasources table 98) to update the file metadata (i.e. DataSources table 100). Once the upload is complete, only then the datasource information from the Transaction Datasources table 98 is moved to the Datasource table 100 and removed from the Transaction Datasources table 98 in steps 84, 86 and 88. This process is "atomic" in nature, that is, no change is recorded if at any instance the transaction fails. The Datasources table 100 includes revision numbers to maintain the integrity of the user's file set.

Figure 12A:
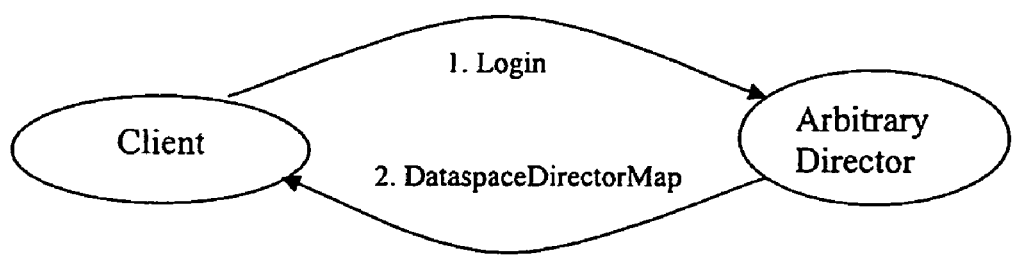
FIGS. 12A and 12B illustrate the operation of the system.
Figure 12B:
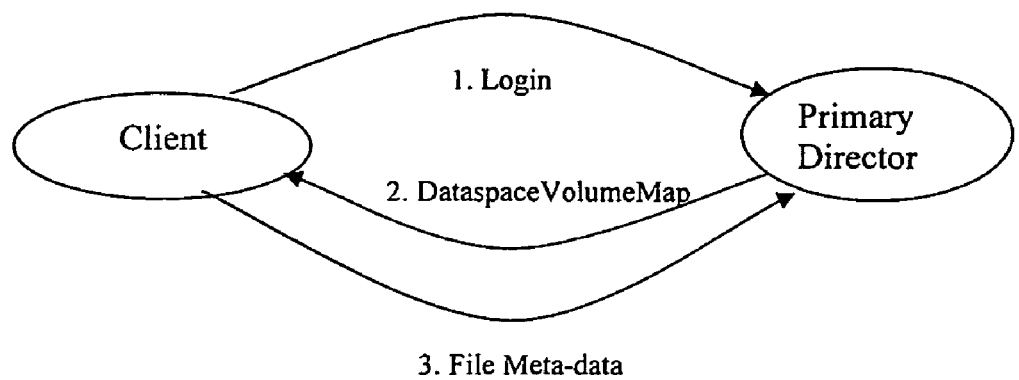

A simple example, as illustrated in FIGS. 12A and 12B, illustrates the operation of the metadata management system 50. The example assumes that the client wants to save a file named "Myfile.txt" on the grid 49.

Step 1: The grid client connects to the director application running on the grid 49. Since the director application is not the primary director 58 for this grid client 64, the director application authenticates the grid client and returns the DataspaceDirectorMap 92. Basically, the director uses the AccountID to find its DataspaceID and return the corresponding DirectorAppID (primary director ID for this client).

Step 2: Once the grid client 64 has the DataspaceDirectorMap 92, it now knows which director is its primary director. The grid client 64 then connects to this director application and the primary director creates a TransactionContextID, as explained above, which is unique for the grid client session. The primary director 58 also sends the grid client 64 its DataspaceVolumeMap 94 (i.e. the number of storage nodes 57 in which the grid client 64 needs to a connection). The grid client 64 sends the file metadata to the director (i.e. fields required in the Transaction Datasources table).

Step 3: By way of an application running on the client, the data slices and coded subsets of "Myfile.txt" are created using storage algorithms as discussed above. The grid client 64 now connects to the various storage nodes 57 on the grid 49, as per the DataspaceVolumeMap 94. The grid client now pushes its data and coded subsets to the various storage nodes 57 on the grid 49.

Step 4: When the grid client 64 is finished saving its file slices on the various storage nodes 57, the grid client 64 notifies the primary director application 58 to remove this transaction from the TransactionDatasources Table 98 and add it to the Datasources Table 100. The system is configured so that the grid clent 64 is not able retrieve any file that is not on the Datasources Table 100. As such, adding the file Metadata on the Datasources table 100 completes the file save/backup operation.

As should be clear from the above, the primary director 58 is an application that decides when a transaction begins or ends. A transaction begins before a primary director 58 sends the storage node 57 metadata to the grid client 64 and it ends after writing the information about the data sources on the Datasources table 100. This configuration insures completeness. As such, if a primary director 58 reports a transaction as having completed, then any application viewing that transaction will know that all the other storage nodes have been appropriately updated for the transaction. This concept of "Atomic Transactions" is important to maintain the integrity of the storage system. For example, if the entire update transaction does not complete, and all of the disparate storage nodes are not appropriately "synchronized," then the storage system is left in a state of disarray, at least for the Dataspace table 100 of the grid client 64 in question. Otherwise, if transactions are interrupted for any reason (e.g., simply by powering off a client PC in the middle of a backup process) and are otherwise left in an incomplete state, the system's overall data integrity would become compromised rather quickly.

Obviously, many modifications and variations of the present invention are possible in light of the above teachings. Thus, it is to be understood that, within the scope of the appended claims, the invention may be practiced otherwise than is specifically described above.

What is claimed and desired to be secured by a Letters Patent of the United States is:

1. An information dispersal system comprising:
   a plurality of storage nodes coupled to a communication network;
   a grid client operatively coupled to said communication network;
   a metadata management system for managing data transfers to and from the storage nodes, said metadata management system including a director, wherein said grid client transmits an account identifier to said director, and in response, said director communicates a list identifying a subset of said plurality of storage nodes that hold data associated with said account identifier; and
   wherein said grid client disperses information to be stored into subsets, and wherein said metadata management system is configured to store said subsets in at least two or more different storage nodes in accordance with the storage nodes identified on said list, and wherein said information may be restored by accessing less than all storage nodes identified by said list.

2. A grid client for use with an information dispersal system including a plurality of storage nodes, each of said storage nodes storing a plurality of data slices wherein n of said data slices are associated with a corresponding file and wherein m of said data slices are required to reconstruct said corresponding file and further wherein m is less than n, the grid client comprising:
   a computer adapted to communicate over a network with said information dispersal system;
   said computer transmitting an account identifier to a second computer;
   said computer receiving from said second computer a list identifying a plurality of storage nodes wherein each of said identified storage nodes stores one or more data slices associated with said account identifier;
   said computer transmitting file metadata to said second computer, said file metadata describing data to be stored on said information dispersal system;
   said computer slicing said data to be stored into a plurality of data slices using an information dispersal algorithm so that the data to be stored may be restored by combining less than all of the plurality of data slices;

said computer transmitting said plurality of data slices to said plurality of storage nodes identified by said list so that each data slice is stored on a separate storage node; and said computer transmitting a notification to said second computer once all of said data slices have been successfully stored.

3. A director for managing metadata associated with an information dispersal system, said information dispersal system including a plurality of storage nodes, each of said storage nodes storing a plurality of data slices wherein n of said data slices are associated with a corresponding file and wherein m of said data slices are required to reconstruct said corresponding file and further wherein m is less than n, the director comprising:
- a server adapted to communicate with said information dispersal system and further adapted to communicate with a grid client;
- said server receiving an account identifier from said grid client;
- said server retrieving a list identifying a plurality of storage nodes associated with said account identifier;
- said server transmitting said list to said grid client;
- said server receiving file metadata from said grid client, said file metadata describing data to be stored on said information dispersal system and including a transaction identifier associated with said data to be stored; and
- said server receiving confirmation from said grid client that said data was successfully stored.

4. The director of claim 3 further comprising a database and wherein said server stores said file metadata in a table hosted by said database, said table being associated with said account identifier.

5. The director of claim 3 wherein said server initiates a transaction on reception of said file metadata and wherein said server retires said transaction on reception of said confirmation.

6. The director of claim 5 further comprising a database and wherein said server stores said transaction in a table hosted by said database, said table being associated with said account identifier.

7. A storage node for use as part of an information dispersal system incorporating multiple storage nodes, said storage node storing a plurality of data slices wherein n of said data slices are associated with a corresponding file and wherein m of said data slices are required to reconstruct said corresponding file and further wherein m is less than n, the storage node comprising:
- storage for storing said plurality of data slices;
- a database hosting a table associating each of said data slices with a slice signature; and
- a computer having access to said storage, said computer further adapted to communicate over a network with said information dispersal system.

8. The storage node of claim 7 wherein said table further associates each of said data slices with an account identifier.

9. method of writing data to an information dispersal system, said method operating on a grid client and comprising the steps of:
- communicating an account identifier to a director and receiving a list identifying storage nodes holding data associated with said account from said director;
- communicating file metadata to said director, said file metadata describing data to be stored on the information dispersal system;
- slicing said data into a plurality of data slices using an information dispersal algorithm so that said data may be restored by combining less than all of the data slices, and communicating said plurality of data slices to said identified storage nodes for storage; and
- notifying said director once all of said data slices have been successfully stored.

10. A method for managing metadata associated with an information dispersal system, said method operating on a director and comprising the steps of:
- receiving an account identifier from a grid client;
- retrieving a list identifying storage nodes associated with said account identifier;
- communicating said list to said grid client;
- receiving file metadata from said grid client, said file metadata including a transaction identifier associated with data to be stored to said identified storage nodes by said grid client; and
- receiving confirmation that said data has been stored.

11. The method of claim 10 further comprising the step of storing said file metadata in a table associated with said account identifier.

12. The method of step claim 10 further comprising the steps of initiating a transaction on reception of said file metadata and retiring said transaction on reception of said confirmation.

13. The method of claim 12 further comprising the step of storing said transaction in a table associated with said account identifier.

14. A method operating on one or more computers and comprising the steps of:
- transmitting an account identifier from a first computer to a second computer;
- receiving on said first computer a list identifying a plurality of storage nodes associated with said account identifier from said second computer wherein each of said storage nodes holds one or more data slices associated with said account identifier;
- slicing on said first computer data to be stored into a plurality of data slices using an information dispersal algorithm so that the data to be stored may be restored by combining less than all of the plurality of data slices; and
- transmitting from said first computer said plurality of data slices to said plurality of storage nodes identified by said list so that each data slice is stored on a separate storage node.

* * * * *

UNITED STATES PATENT AND TRADEMARK OFFICE
CERTIFICATE OF CORRECTION

PATENT NO. : 7,574,579 B2
APPLICATION NO. : 11/404071
DATED : August 11, 2009
INVENTOR(S) : S. Gladwin et al.

It is certified that error appears in the above-identified patent and that said Letters Patent is hereby corrected as shown below:

Column 16, line 1, in Claim 9: before "method" insert --A--.

Signed and Sealed this

Sixteenth Day of March, 2010

David J. Kappos
*Director of the United States Patent and Trademark Office*